United States Patent
Ke

(10) Patent No.: US 11,176,035 B2
(45) Date of Patent: Nov. 16, 2021

(54) DATA STORAGE DEVICES AND DATA PROCESSING METHODS

(71) Applicant: Silicon Motion, Inc., Jhubei (TW)

(72) Inventor: Kuan-Yu Ke, Zhubei (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 16/831,026

(22) Filed: Mar. 26, 2020

(65) Prior Publication Data

US 2020/0401516 A1    Dec. 24, 2020

(30) Foreign Application Priority Data

Jun. 19, 2019 (TW) ................. 108121252

(51) Int. Cl.
*G06F 12/02* (2006.01)
*G06F 12/0882* (2016.01)
*G06F 13/16* (2006.01)

(52) U.S. Cl.
CPC ...... *G06F 12/0253* (2013.01); *G06F 12/0246* (2013.01); *G06F 12/0882* (2013.01); *G06F 13/1689* (2013.01); *G06F 2212/7209* (2013.01)

(58) Field of Classification Search
CPC ...... G06F 3/0613; G06F 3/0617; G06F 3/064; G06F 3/0647; G06F 3/0673; G06F 3/0679; G06F 12/0253; G06F 12/0246; G06F 12/0882; G06F 13/1689; G06F 2212/7205; G06F 2212/7209

USPC .................. 707/813, 818, 820; 711/103, 154
See application file for complete search history.

(56) References Cited

U.S. PATENT DOCUMENTS

| | | | |
|---|---|---|---|
| 2017/0351603 A1* | 12/2017 | Zhang | G06F 3/0659 |
| 2019/0196966 A1* | 6/2019 | Hwang | G06F 12/0253 |
| 2020/0364141 A1* | 11/2020 | Sinha | G06F 3/065 |
| 2021/0073118 A1* | 3/2021 | Masuo | G06F 12/0246 |

* cited by examiner

*Primary Examiner* — Gary J Portka
(74) *Attorney, Agent, or Firm* — Wang Law Firm, Inc.

(57) ABSTRACT

A data storage device includes a memory device and a memory controller. The memory device includes multiple memory blocks. The memory controller determines whether execution of a garbage collection procedure is required according to a number of spare memory blocks. When the execution of the garbage collection procedure is required, the memory controller determines an execution period according to a latest editing status of a plurality of open memory blocks; starts the execution of the garbage collection procedure so as to perform at least a portion of the garbage collection procedure in the execution period; and suspends the execution of the garbage collection procedure when the execution period has expired but the garbage collection procedure is not finished. The memory controller further determines a time interval for continuing the execution of the garbage collection procedure later according to the latest editing status of the open memory blocks.

8 Claims, 4 Drawing Sheets

DATA STORAGE DEVICES AND DATA PROCESSING METHODS

CROSS REFERENCE TO RELATED APPLICATIONS

This Application claims priority to Taiwan Patent Application No. 108121252, filed on Jun. 19, 2019, the entire specification of which is incorporated by reference herein.

BACKGROUND OF THE INVENTION

Field of the Invention

The invention relates to a data storage device and a data processing method capable of effectively processing data stored in the memory device and improving the performance of the memory device.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve the access performance of the data storage device, a novel data processing method which is capable of effectively processing data stored in the memory device and improving the performance of the memory device, is proposed.

BRIEF SUMMARY OF THE INVENTION

Data storage devices and data processing methods are provided. An exemplary embodiment of a data storage device comprises a memory device and a memory controller. The memory controller comprises a plurality of memory blocks. The memory controller is coupled to the memory device and configured to access the memory device. In a garbage collection procedure, the memory controller is configured to determine whether execution of a garbage collection procedure is required according to a number of spare memory blocks. When the memory controller determines that the execution of the garbage collection procedure is required, the memory controller is configured to determine an execution period according to a latest editing status of a plurality of open memory blocks, start the execution of the garbage collection procedure so as to perform at least a portion of the garbage collection procedure in the execution period, and suspend the execution of the garbage collection procedure when the execution period has expired but the garbage collection procedure is not finished. The memory controller is further configured to determine a time interval for continuing the execution of the garbage collection procedure later according to the latest editing status of the open memory blocks.

An exemplary embodiment of a data processing method for a data storage device comprising a memory device and a memory controller, wherein the memory device comprises a plurality of memory blocks, and the memory controller is coupled to the memory device and configured to access the memory device. The method is performed by the memory controller and comprises: determining whether execution of a garbage collection procedure is required according to a number of spare memory blocks; determining an execution period according to a latest editing status of a plurality of open memory blocks when it is determined that the execution of the garbage collection procedure is required; starting execution of the garbage collection procedure so as to perform at least a portion of the garbage collection procedure in the execution period; suspending the execution of the garbage collection procedure when the execution period has expired but the garbage collection procedure is not finished; and determining a time interval for continuing the execution of the garbage collection procedure later according to the latest editing status of the open memory blocks.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof. The scope of the invention is determined by reference to the appended claims.

Figure 1:
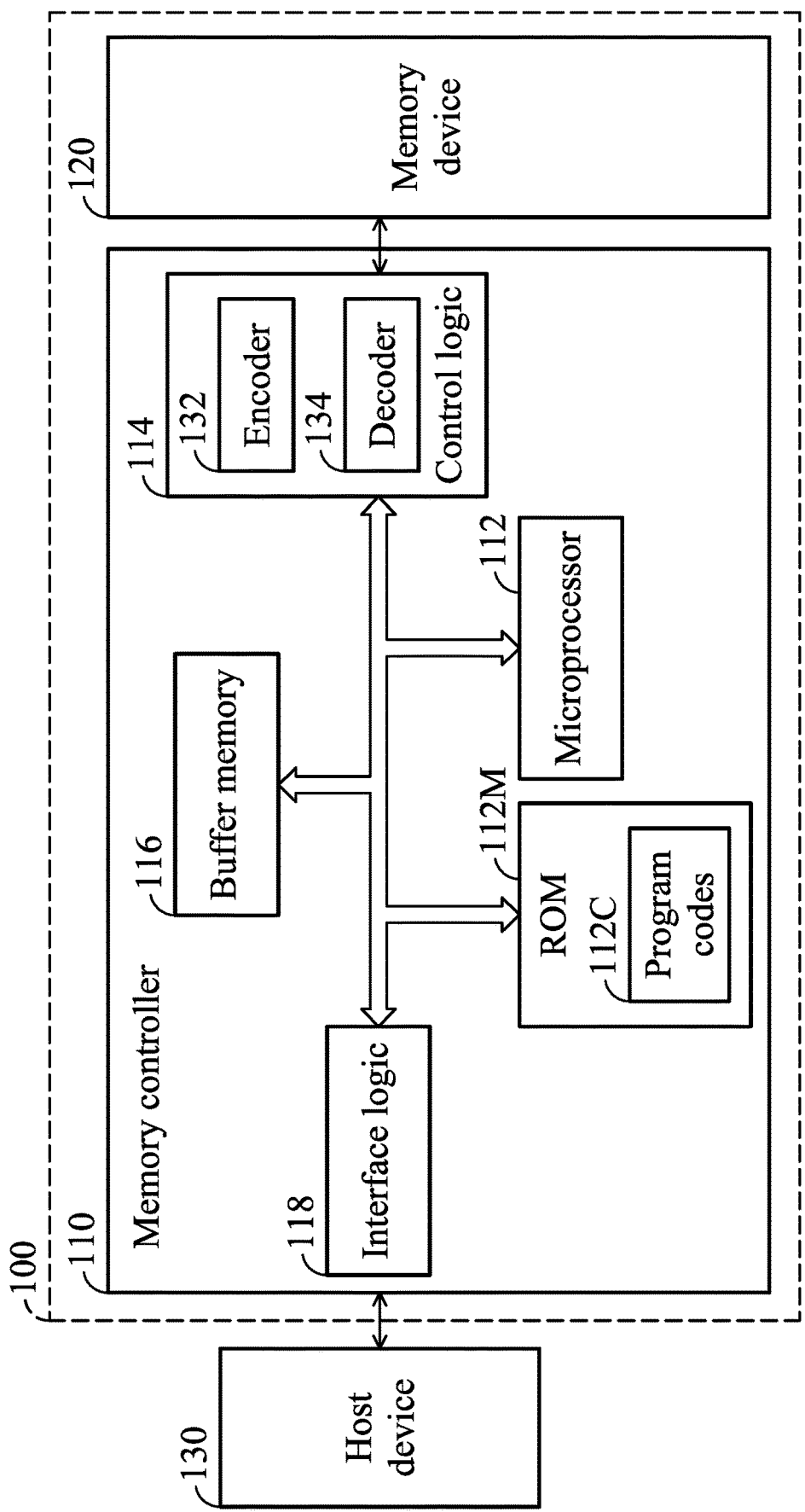
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, that is, the physical pages, and the access unit of a write operation performed by the controller (e.g., the memory controller 110, through the execution of the program codes 112C by the microprocessor 112) on the memory device 120 may be one page.

In practice, the memory controller 110 may perform various control operations by using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. In an embodiment of the invention, the memory controller 110 may use the interface logic 118 to communicate with a host device 130 in compliance with a standard communication protocol. For example, the standard communication protocol may comprise (but not limited to) the Universal Serial Bus (USB) standard, the Secure Digital (SD) interface standard, the Ultra High Speed-I (UHS-I) interface standard, the Ultra High Speed-II (UHS-II) interface standard, the Compact Flash (CF) interface standard, the Multimedia Card (MMC) interface standard, the Embedded Multimedia Card (eMMC) interface standard, the Universal Flash Storage (UFS) interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits data, and the memory cell of the TLC memory block is configured to store three bits data.

Generally, the memory device 120 may be divided into three regions, comprising a system region, a data region and a spare region. The memory controller 110 is configured to select one or more predetermined memory blocks from the spare region as the cache memories, which are also called buffers, to receive data and buffer the data. When a predetermined memory block (that is, the buffer) is full (that is, has been fully written with data), the memory controller may further update the predetermined memory block currently being utilized as a buffer as a data block in the data region. For example, when the predetermined memory block currently being utilized as a buffer to receive data is an MLC or a TLC memory block, when the buffer is full, the predetermined memory block may be directly updated as a data block in the data region. When the predetermined memory block currently being utilized as a buffer to receive data is an SLC memory block, when a predetermined number of buffers are full, the memory controller may perform a garbage collection procedure to move the data stored in the buffers to an MLC or a TLC memory block (the destination memory block) and update the destination memory block as a data block in the data region.

The "Garbage Collection" is operative to collect valid data distributed over several memory blocks and move the collected valid data to a specific memory block. After performing the garbage collection procedure, the memory blocks containing only invalid data can be erased and released as spare memory blocks. However, performing the garbage collection procedure usually requires considerable resources for calculation. Therefore, access performance of the memory device will be degraded when execution of the garbage collection procedure is started too early or when execution period of the garbage collection procedure takes too long. On the other hand, when the execution of the garbage collection procedure is started too late, or when the execution period of the garbage collection procedure is too short, the speed of releasing the spare memory blocks is too slow and the problem of insufficient spare memory blocks raised, causing the operations of accessing to the memory device being stuck due to insufficient memory space.

In view of this, to optimize the efficiency of executing the garbage collection procedure, a novel data processing method is proposed. By dynamically adjusting the parameters utilized for controlling the execution of the garbage collection procedure, the efficiency of the execution of the garbage collection procedure can be optimized and the access performance of the memory device can be greatly improved.

According to an embodiment of the invention, the parameters utilized for controlling the execution of the garbage collection procedure may comprise:

Parameter A: the number of spare memory blocks;

Parameter B: the time interval between two executions of the garbage collection procedure; and Parameter C: the execution period of the garbage collection procedure.

In an embodiment of the invention, the memory controller 110 is configured to determine whether the execution of a garbage collection procedure is required according to the number of spare memory blocks (parameter A) (that is, how many spare memory blocks there are). To be more specific, when the amount of spare memory blocks is not lower than a low threshold value, the memory controller 110 determines that the current amount of spare memory blocks is still enough. Therefore, there is no need to execute the garbage collection procedure. On the other hand, when the amount of spare memory blocks is dropped to become lower than the low threshold value, the memory controller 110 determines that the current amount of spare memory blocks is no longer enough. Therefore, the memory controller 110 determines that the execution of the garbage collection procedure is required and may determine to start the execution of the garbage collection procedure.

According to an embodiment of the invention, the memory controller 110 may distribute the execution of the garbage collection procedure at different time. That is, the memory controller 110 usually does not finish the whole garbage collection procedure in one execution opportunity, but performs the garbage collection procedure at several execution opportunities that occupy shorter time period, intermittently. In other words, the memory controller 110 may intermittently perform the garbage collection procedure at different time, and the memory controller 110 executes one or more portions of the garbage collection procedure in each execution opportunity. For example, the memory controller 110 may insert the execution of one or more portions of the garbage collection procedure in one or more write/read operations of the memory device 120, so as to distribute the time that the calculation resources being occupied by the execution of the garbage collection procedure.

According to an embodiment of the invention, the memory controller 110 may dynamically determine the execution period of the garbage collection procedure (parameter C) in an execution opportunity and the time interval between two executions of the garbage collection procedure (parameter B), dynamically, according to the latest editing status of a plurality of open memory blocks, and is configured to insert the execution of one or more portions of the garbage collection procedure in one or more write/read operations of the memory device 120 according to the execution period (parameter C) and the time interval (parameter B). Noted that the 'open memory blocks' means that the memory blocks that have not been fully written with data and can still be utilized to receive data. In contrast, the 'closed memory blocks' are the memory blocks that have been fully written with data.

Figure 2:
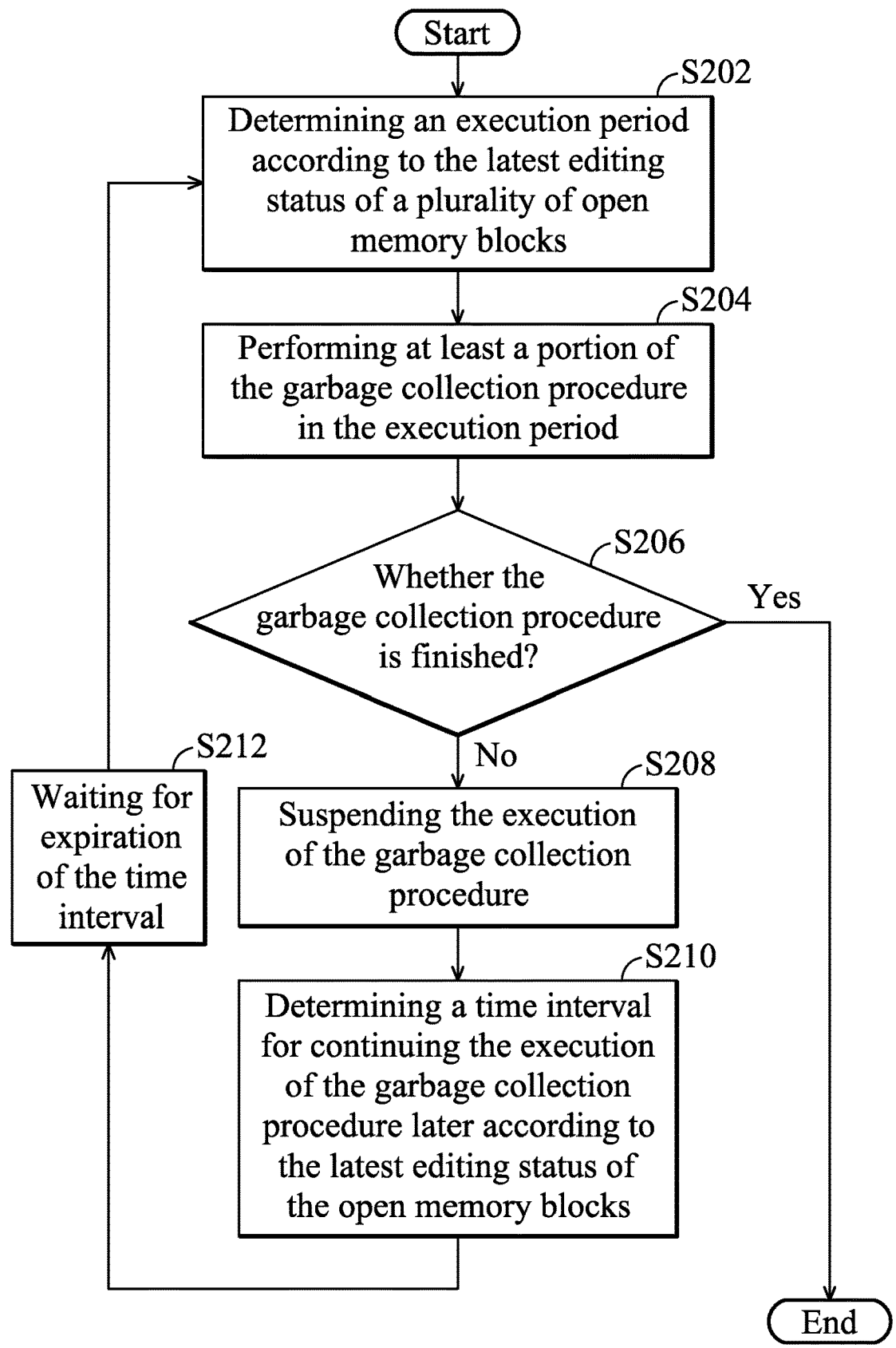
FIG. 2 is an exemplary flow chart of a data processing method according to an embodiment of the invention.

FIG. 2 is an exemplary flow chart of a data processing method according to an embodiment of the invention. First of all, when the memory controller 110 determines that execution of the garbage collection is required, the memory controller 110 may start execution of the garbage collection procedure and determine an execution period (parameter C) according to the latest editing status of a plurality of open memory blocks (Step S202). The execution period (parameter C) is the time period that the memory controller 110 can perform or execute the garbage collection procedure in this execution opportunity (that is, the current or a forthcoming execution opportunity). Next, the memory controller 110 is configured to execute or perform at least a portion of the garbage collection procedure in the execution period determined in step S202 (Step S204). When the execution period is expired, the memory controller 110 may further determine whether the garbage collection procedure is finished (Step S206). For example, in the garbage collection procedure, the memory controller 110 may determine to pick up the data blocks having the valid page count VP_Count lower than a VP threshold as the source memory blocks. When the all the valid pages comprised in the source memory blocks having the valid page count VP_Count lower than the VP threshold have been moved to the destination memory block, the memory controller 110 may determine that the data collection procedure is finished.

When the memory controller 110 determines that the data collection procedure is finished, the flow is ended. When the memory controller 110 determines that the data collection procedure is not finished, the memory controller 110 is configured to suspend the execution of the garbage collection procedure (Step S208) and dynamically determine a time interval (parameter B) for continuing the execution of the garbage collection procedure later according to the latest editing status of the open memory blocks (Step S210). That is, in step S210, the memory controller 110 is configured to dynamically determine the time interval between this execution and the next execution of the garbage collection procedure.

Next, the memory controller 110 is configured to wait for expiration of the time interval determined in step S210 (Step S212). After the time interval determined in step S210 is expired, step S202 is returned and the memory controller 110 is configured to re-determine the execution period (parameter C) according to the latest editing status of a plurality of open memory blocks and continue the execution of the garbage collection procedure in step S204. It should be noted that according to an embodiment of the invention, the memory controller 110 may perform any operation during the time interval in step S212. For example, the memory controller 110 may perform one or more read/write operations in response to the commands received from the host device 130 and may return to step S202 after the one or more read/write operations are completed and the time interval is expired.

According to an embodiment of the invention, as shown in FIG. 2, every time the memory controller 110 continues the execution of the (unfinished) garbage collection procedure, the memory controller 110 may re-determine the execution period (parameter C) for this execution according to the latest editing status of a plurality of current open memory blocks. In other words, in the embodiments of the invention, the execution period (parameter C) is not a fixed value, and can be dynamically adjusted according to the latest editing status of the memory blocks.

In addition, according to an embodiment of the invention, as shown in FIG. 2, every time the execution of the garbage collection procedure is suspended, the memory controller 110 is configured to re-determine the time interval (parameter B) for continuing the execution of the garbage collection procedure later according to the latest editing status of the current open memory blocks. In other words, in the embodiments of the invention, the time interval (parameter B) is also not a fixed value, and can be dynamically adjusted according to the latest editing status of the memory blocks.

It should be noted that in other embodiments of the invention, when the execution of the garbage collection procedure is suspended, the memory controller 110 may also determine the parameter B and the parameter C at the same time according to the latest editing status of the memory blocks at that time. Similarly, in other embodiments of the invention, the memory controller 110 may also determine the parameter B and the parameter C at the same time according to the latest editing status of the memory blocks at the time when the memory controller 110 continues the execution of the garbage collection procedure.

According to an embodiment of the invention, as discussed above, the open memory blocks are the memory blocks that have not been fully written with data by the memory controller 110. For example, before an aforementioned predetermined memory block that is selected by the memory controller 110 as the buffer has not been fully written with data, the predetermined memory block is one of the open memory blocks in the system of the data storage device 100.

In addition, the memory controller 110 may maintain a plurality of Physical to Logical (P2L) mapping tables for the system of the data storage device 100 in one or more memory blocks. The P2L mapping tables may comprise information regarding the mapping relationship between a plurality of physical addresses and a plurality of logical addresses. The P2L mapping tables may comprise a plurality of fields. One field records the corresponding mapping information of one physical page of a memory block, that is, which logical page the data stored in the corresponding physical page of a memory block is directed to (corresponding to). According to an embodiment of the invention, before the memory block(s) utilized for storing the P2L mapping tables is/are full, the memory block(s) is/are the open memory blocks in the system of the data storage device 100.

Similarly, the memory controller 110 may maintain a plurality of Logical to Physical (L2P) mapping tables for the system of the data storage device 100 in one or more memory blocks. The L2P mapping tables may comprise information regarding the mapping relationship between a plurality of logical addresses and a plurality of physical addresses. The L2P mapping tables may comprise a plurality of fields. One field corresponds to one logical page of the host device system, so as to record the mapping information of the corresponding logical page, that is, which memory block and which physical page the data of the corresponding logical page is directed to (is actually stored in). According to an embodiment of the invention, before the memory block(s) utilized for storing the L2P mapping tables is/are full, the memory block(s) is/are the open memory blocks in the system of the data storage device 100.

Besides, the memory controller 110 may maintain at least one system table memory block (called system table block for brevity). The system table block may be utilized for storing a plurality of system tables. For example, one page in the system table block may be utilized to store one system table. Here, the system table may be a root table recording the corresponding addresses at which the tables (for example, the L2P mapping table, the P2L mapping table) are stored in the memory device 120, a wear leveling table recording the wear leveling of each memory block, the VP table recording the number of valid pages of each memory block, etc. Generally, every time the memory controller 110 has to update the content of the system table, the memory controller 110 may write the updated content of the system table to an empty page of the system table block. Therefore, in the embodiments of the invention, before the system table block is full, it is also one of the open memory blocks in the system of the data storage device 100.

In addition, in the garbage collection procedure, the memory controller 110 may select a spare memory block as a destination memory block and is configured to move the valid data from at least one source memory block to the destination memory block. Therefore, in the embodiment of the invention, before the destination memory block is full, it is also one of the open memory blocks in the system of the data storage device 100.

According to an embodiment of the invention, the editing status of a memory block may be the number of remaining empty pages in this memory block. According to another embodiment of the invention, the editing status of a memory block may be the number of valid pages in this memory block. According to yet another embodiment of the invention, the editing status of a memory block may be the number of non-empty pages in this memory block. In the embodiment of the invention, the purpose of dynamically adjusting the parameter B and the parameter C is to adjust the speed of releasing the spare memory blocks (or, the speed of generating the spare memory blocks) by controlling the execution period of the garbage collection procedure and the time interval between successive execution opportunities, such that the speed of generating the spare memory blocks can be faster than the speed of consuming the spare memory blocks. Therefore, the memory controller 110 may perform some calculation based on the number of remaining empty pages and/or the number of valid pages in one or more current open memory blocks to determine the parameter B and the parameter C. Since the memory controller 110 may keep monitoring the latest editing status of the open memory blocks that are currently opened for editing, the latest editing status can effectively reflect the speed of consuming the spare memory blocks. In this manner, by performing some proper calculation on the latest editing status and dynamically adjust the parameter B and the parameter C based on this information, the speed of generating the spare memory blocks can be faster than the speed of consuming the spare memory blocks, and a good balance between the time interval and the execution period of the garbage collection procedure can be achieved, and the efficiency of the execution of the garbage collection procedure can be optimized.

According to an embodiment of the invention, the unit used for calculating the time interval between successive execution opportunities (parameter B) may be a unit of time, or it may be the number of host device commands executed by the memory controller 110, or the amount of data that is processed by the memory controller 110 in response to the host device commands. Similarly, according to an embodiment of the invention, the unit used for calculating the execution period of the garbage collection procedure (parameter C) may be a unit of time, or it may be the amount of data that has been transferred by the memory controller 110. For example, the memory controller 110 may set the time interval (parameter B) as 10 seconds, 10 read/write commands completely executed by the memory controller 110, or 100M bytes of data processed by the memory controller 110. In another example, the memory controller 110 may set the execution period (parameter C) as 100 milliseconds, or 100M bytes of data transferred by the memory controller 110.

Figure 3:
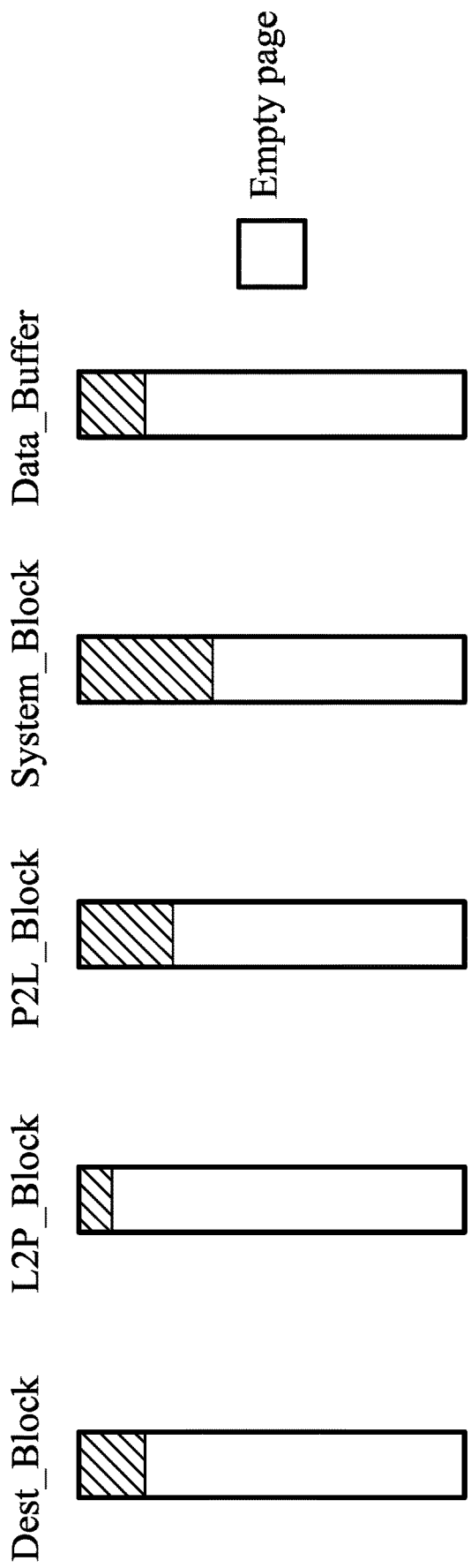
FIG. 3 is an schematic diagram showing the editing statuses of the open memory blocks according to an embodiment of the invention.
Figure 4:
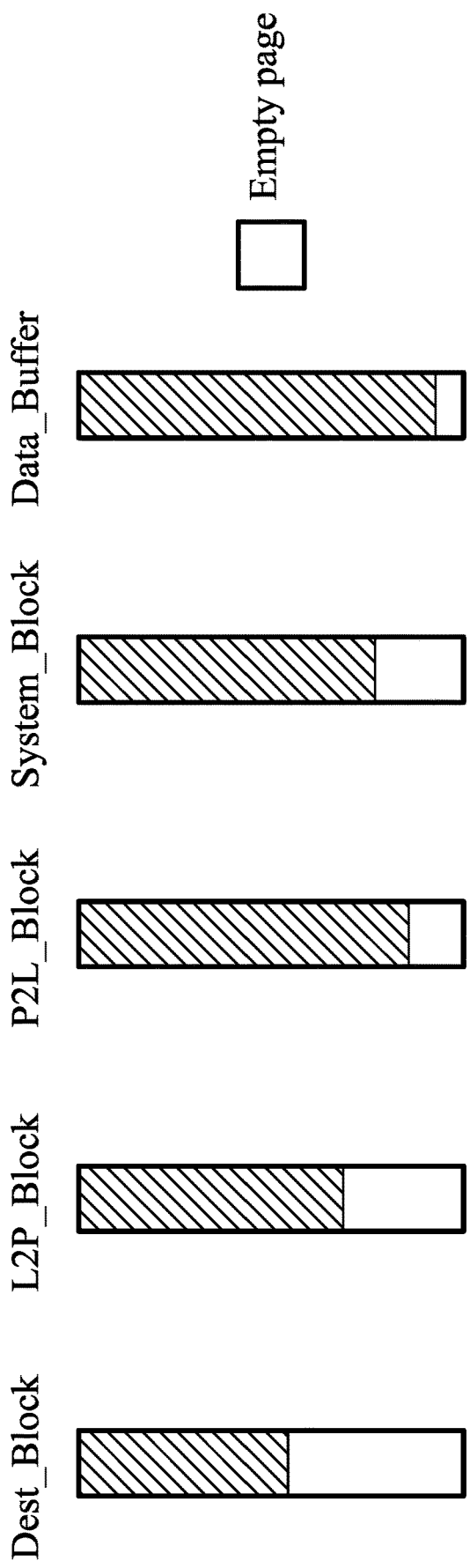
FIG. 4 is another schematic diagram showing the editing statuses of the open memory blocks according to an embodiment of the invention.

FIG. 3 and FIG. 4 are the schematic diagrams showing different editing statuses of the open memory blocks for illustrating the concept of dynamically adjusting the parameters utilized for controlling the execution of the garbage collection procedure according to the embodiments of the invention. In this embodiment, the number (or ratio) of empty pages in the open memory blocks is referenced by the memory controller 110 as the current editing statuses of the open memory blocks. The open memory blocks may comprise the destination memory block Dest_Block utilized for executing the garbage collection procedure, the memory block L2P_Block utilized for storing the L2P mapping information, the memory block P2L_Block utilized for storing the P2L mapping information, the system table block System_Block utilized for storing a plurality of system tables, and the predetermined memory block Data_Buffer utilized as the buffer.

The memory controller 110 may calculate an average of the number or the ratio of the empty pages comprised in the open memory blocks as a representative of the editing status of the open memory blocks, or may take the maximum or the minimum of the number or the ratio of the empty pages comprised in the open memory blocks as a representative of the editing status of the open memory blocks. In the following paragraphs, the value of empty page Open_Block_EP is used for representing the aforementioned average or the maximum or minimum of the number or the ratio of the empty pages comprised in the open memory blocks. As shown in FIG. 3, when the value of empty page Open_Block_EP is large, it means that there are still a lot of memory spaces that can be programmed. Therefore, the memory controller 110 does not have to frequently execute the garbage collection. As shown in FIG. 4, when the value of empty page Open_Block_EP is small, it means that there are a few memory spaces that can be programmed. Therefore, the memory controller 110 has to execute the garbage collection more frequently. In this manner, when the memory controller 110 detects that the value of empty page Open_Block_EP is increased, the memory controller 110 may accordingly increase the time interval (parameter B) and decrease the execution period (parameter C). On the other hand, when the memory controller 110 detects that the value of empty page Open_Block_EP is decreased, the memory controller 110 may accordingly decrease the time interval (parameter B) and increase the execution period (parameter C).

In addition, according to another embodiment of the invention, the memory controller 110 may also dynamically adjust the time interval (parameter B) and the execution period (parameter C) according to the number of spare memory blocks (parameter A). For example, every time the memory controller 110 has to re-determine the time interval (parameter B) and the execution period (parameter C) (for example, steps S202 and S210 shown in FIG. 2), the memory controller 110 may further refer to the number of spare memory blocks (parameter A) and determine the time interval (parameter B) and the execution period (parameter C) according to the number of spare memory blocks (parameter A).

For example, when the memory controller 110 detects that the number of spare memory blocks (parameter A) is increased, the memory controller 110 may accordingly increase the time interval (parameter B) and decrease the execution period (parameter C). On the other hand, when the memory controller 110 detects that the number of spare memory blocks (parameter A) is decreased, the memory controller 110 may accordingly decrease the time interval (parameter B) and increase the execution period (parameter C).

In addition, according to yet another embodiment of the invention, the memory controller 110 may also dynamically adjust the time interval (parameter B) and the execution period (parameter C) according to both the latest editing status of the open memory blocks and the number of spare memory blocks (parameter A).

In addition, in the embodiments of the invention, the memory controller 110 may also predefine a plurality of sets of values for the time interval (parameter B) and the execution period (parameter C). Each set of values may correspond to a specific number of spare memory blocks, a specific range of the number of spare memory blocks, a specific editing status, a specific range of editing status (when the editing status can be represented by values) or one or more combinations thereof. When adjusting the time interval (parameter B) and the execution period (parameter C), the memory controller 110 may directly select a set of values for the time interval (parameter B) and the execution period (parameter C) according to the current number of spare memory blocks and/or the latest editing status of the open memory blocks.

In addition, in other embodiments of the invention, the memory controller may also predefine a set of values for the time interval (parameter B) and the execution period (parameter C). For example, the memory controller 110 may predefine a set of values for the time interval (parameter B) and the execution period (parameter C) correspond to the worst condition that an instant execution of the garbage collection is required, or a set of values for the time interval (parameter B) and the execution period (parameter C) correspond to the best condition that the execution of the garbage collection is nearly not required, and may perform some calculation based on the current number of spare memory blocks and/or the latest editing status of the open memory blocks to obtain the values of the corresponding time interval (parameter B) and the execution period (parameter C). For example, the memory controller 110 may predefine the parameter B as 32K bytes and the parameter C as 150 Bytes for the worst condition. Under these conditions, every time the memory controller 110 has finished programming 32K bytes of data, the write operation will be suspended and the memory controller 110 may execute the garbage collection procedure to perform 150 Bytes of data transfer. After the 150 Bytes of data transfer has been finished, the memory controller 110 may continue to perform the write operation. In other words, if the host device 130 has requested to write 1M bytes of data to the memory device 120, the memory controller 110 is configured to suspend the write operation every time 32K bytes of data is finished programming and perform a portion of the garbage collection procedure.

In this example, if the memory controller 110 takes the ratio of the number of valid pages in the open memory blocks to the total number of pages comprised in the memory blocks as a reference of the latest editing status of the memory blocks and obtains that an averaged ratio of the valid pages of open memory blocks is 13% based on a corresponding calculation, the memory controller 110 may dynamically adjust the time interval (parameter B) as 32K/13%=246K Bytes and adjust the execution period (parameter C) as 150*13%=20 Bytes (to round up to the nearest integer). If the averaged ratio of the valid pages of open memory blocks is 80%, the memory controller 110 may dynamically adjust the time interval (parameter B) as 32K/80%=40K Bytes and adjust the execution period (parameter C) as 150*80%=120 Bytes. It should be noted that the way to derive the execution period (parameter C) and the time interval (parameter B) is merely one of a variety of ways to implement the concept of the invention, and the invention should not be limited to the aforementioned example.

In another example, according to yet another embodiment of the invention, the memory controller 110 may also predefine a plurality of sets of values for the time interval (parameter B) and the execution period (parameter C). Each set of values may correspond to a specific number of spare memory blocks or a specific range of the number of spare memory blocks. When adjusting the time interval (parameter B) and the execution period (parameter C), the memory controller 110 may directly select a set of values for the time interval (parameter B) and the execution period (parameter C according to the current number of spare memory blocks. Next, the memory controller 110 may further fine-tune the selected set of values according to the latest editing status of the open memory blocks. For example, the memory controller 110 may perform some calculation on the selected set of values according to the latest editing status of the open memory blocks as discussed above to obtain the values of the time interval (parameter B) and the execution period (parameter C) suitable for the current condition.

In yet another example, according to yet another embodiment of the invention, the memory controller 110 may also predefine a plurality of sets of values for the time interval (parameter B) and the execution period (parameter C). Each set of values may correspond to a specific editing status or a specific range of editing status (when the editing status can be represented by values). When adjusting the time interval (parameter B) and the execution period (parameter C), the memory controller 110 may directly select a set of values for the time interval (parameter B) and the execution period (parameter C according to the latest editing status of the open memory blocks. Next, the memory controller 110 may further fine-tune the selected set of values according to the current number of spare memory blocks. For example, the memory controller 110 may perform some calculation on the selected set of values according to the current number of spare memory blocks as discussed above to obtain the values of the time interval (parameter B) and the execution period (parameter C) suitable for the current condition.

As discussed above, since the change in the latest editing status of the open memory blocks and/or the change in the number of spare memory blocks can effectively reflect the speed of consuming the spare memory blocks, the memory controller 110 may obtain the information regarding the speed of consuming the spare memory blocks based on the information regarding the latest editing status of the open memory blocks and/or the number of spare memory blocks, or obtain the information regarding the speed of consuming the spare memory blocks by performing some proper calculation on the latest editing status of the open memory blocks and/or the number of spare memory blocks. Next, the memory controller 110 may dynamically adjust the parameters B and C according to the information, such that the speed of generating the spare memory blocks can be faster than the speed of consuming the spare memory blocks. In addition, by dynamically adjust the parameter B and the parameter C based on this information, a good balance between the time interval and the execution period of the garbage collection procedure can be achieved, and the efficiency of the execution of the garbage collection procedure can be optimized.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage device, comprising:
    a memory device, comprising a plurality of memory blocks; and
    a memory controller, coupled to the memory device and configured to access the memory device, wherein the memory controller is configured to determine whether execution of a garbage collection procedure is required according to a number of spare memory blocks, and when the memory controller determines that the execution of the garbage collection procedure is required, the memory controller is configured to determine an execution period according to a latest editing status of a plurality of open memory blocks, start the execution of the garbage collection procedure so as to perform at least a portion of the garbage collection procedure in the execution period, and suspend the execution of the garbage collection procedure when the execution period has expired but the garbage collection procedure is not finished, and wherein the memory controller is further configured to determine a time interval for continuing the execution of the garbage collection procedure later according to the latest editing status of the open memory blocks,
    wherein every time the memory controller continues the execution of the garbage collection procedure, the memory controller is configured to dynamically determine the execution period for this execution according to the latest editing status of the open memory blocks,
    wherein every time the execution of the garbage collection procedure is suspended, the memory controller is configured to dynamically determine the time interval between this execution and a next execution of the garbage collection procedure according to the latest editing status of the open memory blocks.

2. The data storage device as claimed in claim 1, wherein the memory controller is configured to insert the execution of one or more portions of the garbage collection procedure in one or more write/read operations of the memory device according to the execution period and the time interval.

3. The data storage device as claimed in claim 1, wherein the latest editing status of the open memory blocks is a number of remaining empty pages in the open memory blocks.

4. The data storage device as claimed in claim 1, wherein the latest editing status of the open memory blocks is a number of valid pages in the open memory blocks.

5. A data processing method for a data storage device comprising a memory device and a memory controller, wherein the memory device comprises a plurality of memory blocks, the memory controller is coupled to the memory device and configured to access the memory device, and the method is performed by the memory controller and comprises:
    determining whether execution of a garbage collection procedure is required according to a number of spare memory blocks;
    determining an execution period according to a latest editing status of a plurality of open memory blocks when it is determined that the execution of the garbage collection procedure is required;
    starting execution of the garbage collection procedure so as to perform at least a portion of the garbage collection procedure in the execution period;
    suspending the execution of the garbage collection procedure when the execution period has expired but the garbage collection procedure is not finished;
    determining a time interval for continuing the execution of the garbage collection procedure later according to the latest editing status of the open memory blocks;
    continuing the execution of the garbage collection procedure, wherein every time the execution of the garbage collection procedure is continued, the execution period for this execution is determined dynamically according to the latest editing status of the open memory blocks; and
    every time the execution of the garbage collection procedure is suspended, determining the time interval between this execution and a next execution of the garbage collection procedure dynamically according to the latest editing status of the open memory blocks.

6. The data processing method as claimed in claim 5, wherein the execution of one or more portions of the garbage collection procedure is inserted in one or more write/read operations of the memory device according to the execution period and the time interval.

7. The data processing method as claimed in claim 5, wherein the latest editing status of the open memory blocks is a number of remaining empty pages in the open memory blocks.

8. The data processing method as claimed in claim 5, wherein the latest editing status of the open memory blocks is a number of valid pages in the open memory blocks.

* * * * *